(12) United States Patent
Ho et al.

(10) Patent No.: US 7,950,565 B2
(45) Date of Patent: May 31, 2011

(54) HIGH SPEED BALL SHEAR MACHINE

(75) Inventors: Cheng-En Ho, Taipei County (TW); Han-Lin Chung, Yilan County (TW)

(73) Assignee: Yuan Ze University, Chung-Li (TW)

( * ) Notice: Subject to any disclaimer, the term of this patent is extended or adjusted under 35 U.S.C. 154(b) by 0 days.

(21) Appl. No.: 12/555,192

(22) Filed: Sep. 8, 2009

(65) Prior Publication Data
US 2010/0301100 A1 Dec. 2, 2010

(30) Foreign Application Priority Data

Jun. 1, 2009 (TW) ................................. 98118041 A

(51) Int. Cl.
*B23K 1/18* (2006.01)
*G01N 3/08* (2006.01)
(52) U.S. Cl. ............... 228/21; 228/264; 73/841; 73/842; 73/831
(58) Field of Classification Search ............... 228/21, 228/264; 73/841, 815, 842, 831
See application file for complete search history.

(56) References Cited

U.S. PATENT DOCUMENTS

| | | | | |
|---|---|---|---|---|
| 4,857,131 | A | * | 8/1989 | Damico et al. ............ 156/331.1 |
| 6,038,931 | A | * | 3/2000 | Long et al. ...................... 73/850 |
| 6,371,355 | B1 | | 4/2002 | Newman |
| 2004/0103726 | A1 | * | 6/2004 | Cox ................................ 73/842 |
| 2008/0136018 | A1 | * | 6/2008 | Kato et al. .................... 257/737 |

FOREIGN PATENT DOCUMENTS

EP 772036 * 5/1997

OTHER PUBLICATIONS

Song et al. (NPL, Electronic Component and Technology Conference, pp. 1504-1513, 2007, Figures (a) and (b)).*

* cited by examiner

*Primary Examiner* — Roy King
*Assistant Examiner* — Michael Aboagye
(74) *Attorney, Agent, or Firm* — J.C. Patents

(57) ABSTRACT

A high speed ball shear machine is adapted for removing a metal bump fixed on a substrate. The high speed ball shear machine includes a fixing base, a shear tool, and a metal bump catcher. The substrate is fixed on the top surface of the fixing base. The shear tool is disposed above the top surface. The fixing base is adapted for being translated along a translation path relative to the shear tool, wherein the translation path is a straight path. When the fixing base translates along the path, the metal bump is driven to strike the shear tool so as to separate itself from the substrate. The metal bump catcher, which is adapted for catching the drop bump after the striking, is disposed on the side wall of the fixing base. The bump catcher has a fillister with a configuration depicted in the figures of this invention.

16 Claims, 4 Drawing Sheets

HIGH SPEED BALL SHEAR MACHINE

CROSS-REFERENCE TO RELATED APPLICATION

This application claims the priority benefit of Taiwan application serial no. 98118041, filed Jun. 1, 2009. The entirety of the above-mentioned patent application is hereby incorporated by reference herein and made a part of specification.

BACKGROUND OF THE INVENTION

1. Field of the Invention

The present invention relates to a high speed ball shear machine, and more particularly to a high speed ball shear machine capable of collecting dropping metal bumps.

2. Description of Related Art

Soldering is a key process for manufacturing solder joints, which is to apply an alloy with a lower melting point to joint two opposite materials together. The functions of solder joints are not only adopted as signal and electrical power passages between the devices, but also as the mechanical support during devices operation. According to recent International Roadmap for Semiconductor Technology announced by the Semiconductor Industry Association (SIA), more than 4000 solder joints can appear in a single high performance chip today. With demands of being light, thin, compact, and having more input/output terminals for the electronic products, the quantity of the solder joints required in the high performance chip is expected to increase significantly in the next few years. However, solder joints have long been recognized to be the weakest link within an electronic product. Any failure in one solder joint can make the whole package un-operated. Hence, how to improve the quality and evaluate the reliability of the solder joints have become the most critical technique in electronic industry.

Solder bumps or metal bumps refer to a hemi-spherical solder joint configuration formed by a solder connected with a pad only on one side. In the microelectronic industry, the ball shear test is usually applied to evaluate the reliability of the metal bumps. Here, the high speed ball shear test is one of the evaluating methods that are recently being valued seriously. The high speed ball shear simulates a situation where the metal bump is under high impact, thereby evaluating mechanical behaviors of the metal bump under high strain rate.

However, under the high speed ball shearing, the cracked metal bump drops into the inside of the machine due to the impact of the shear knife of the high speed shear machine. Hence, the operation of the machine usually has to be shut down for collecting the cracked metal bumps. The process of collecting the metal bumps is time and labor consuming. Moreover, in the collecting process, the metal bumps lately dropped are easily mixed with the metal bumps previously dropped and not yet removed, thereby affecting the following analysis of the cracked surface.

SUMMARY OF THE INVENTION

The present invention is directed to a high speed ball shear machine capable of collecting dropped bumps.

The present invention is directed to a high speed ball shear machine, which is adapted for removing a metal bump fixed on a substrate. The high speed ball shear machine includes a fixing base, a shear tool, and a metal bump catcher. The substrate is fixed on a first surface of the fixing base. The shear tool is disposed on top of the first surface. The fixing base is adapted for translating along a translation path relative to the shear tool and the translation path is a straight path. When the fixing base translates along the translation path relative to the shear tool, an end of the shear tool drives the metal bump toward a side of the fixing base, so that the metal bump cracks to separate from the substrate. The metal bump catcher is disposed on a sidewall of the fixing base and includes a fillister. Here, an open end of the fillister faces the top of the first surface.

In one embodiment of the present invention, an inside wall of the metal bump catcher is a curved face.

In one embodiment of the present invention, a shape of the metal bump catcher is a funnel shape and a bottom end of the metal bump catcher includes a through hole. A diameter of the through hole is greater than a greatest diameter of the metal bump.

In one embodiment of the present invention, the metal bump catcher has a bent line which divides the metal bump catcher into a bottom plate and a sidewall. An edge of the sidewall is connected with an edge of the bottom plate.

In one embodiment of the present invention, an upper edge of the metal bump catcher includes a second surface facing the top of the first surface. The first surface and the second surface are disposed on different planes, and the sidewall is connected therebetween.

In one embodiment of the present invention, the metal bump catcher is a rectangular structure.

In one embodiment of the present invention, a length of the metal bump catcher is approximately 10 centimeter (cm).

In one embodiment of the present invention, a width of the metal bump catcher is approximately 8 cm.

In one embodiment of the present invention, a height of the metal bump catcher is approximately 3 cm.

In one embodiment of the present invention, a material of the metal bump catcher is the same as that of the fixing base.

In one embodiment of the present invention, the metal bump catcher and the fixing base form an integrated structure.

In one embodiment of the present invention, the high speed ball shear machine further includes a rigid sheet and an adhesive gel. The rigid sheet is disposed between the fixing base and the substrate, and the adhesive gel is disposed between the rigid sheet and the substrate.

In one embodiment of the present invention, the rigid sheet is a glass substrate, a metal substrate, a ceramic substrate, a plastic substrate, a circuit board, or a composite material substrate.

In one embodiment of the present invention, a material of the adhesive gel is cyanoacrylate (usually referred as an instant glue).

In one embodiment of the present invention, the high speed ball shear machine further includes a clamp fixed on the fixing base. The clamp includes a first portion and a second portion respectively disposed on relative two sides of the rigid sheet. The first portion and the second portion clamp the rigid sheet, so that the rigid sheet is fixed on the fixing base.

In light of the foregoing, in search of the metal bumps inside the machine, the metal bump catcher of the present invention allows the direct collection of the metal bumps dropped by the shear tool without shutting the machine down. Hence, the metal bump catcher saves the time and labor required for collecting the metal bumps.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
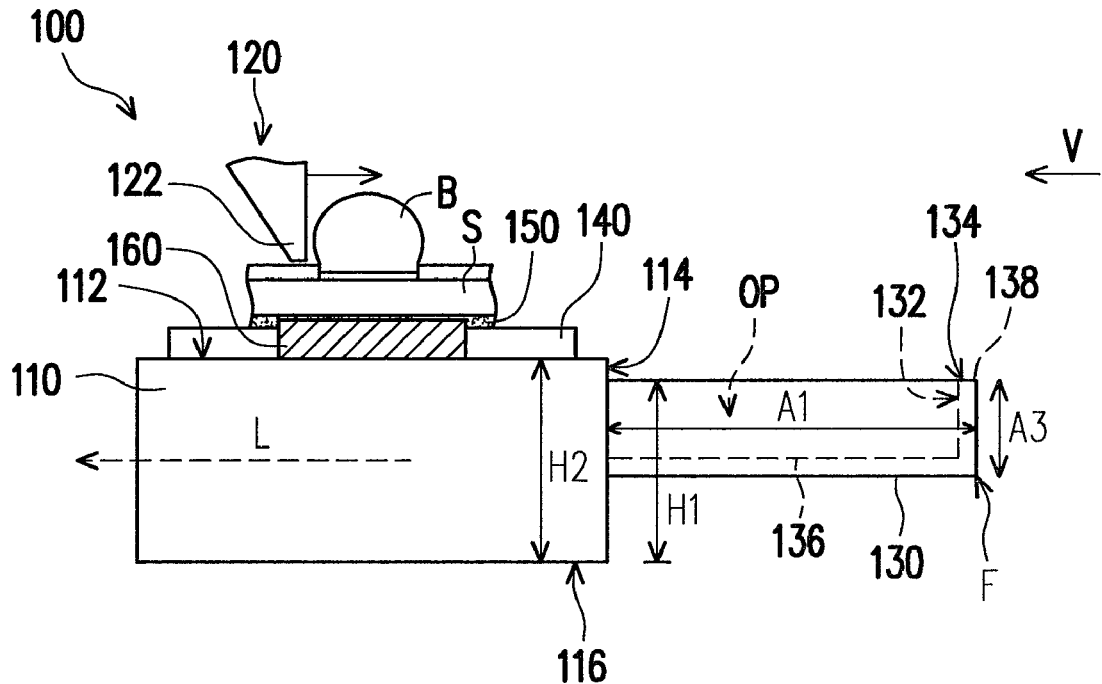
FIGS. 1A through 1C are schematic diagrams illustrating a high speed ball shear machine in a ball shearing process according to one embodiment of the present invention.
Figure 1B:
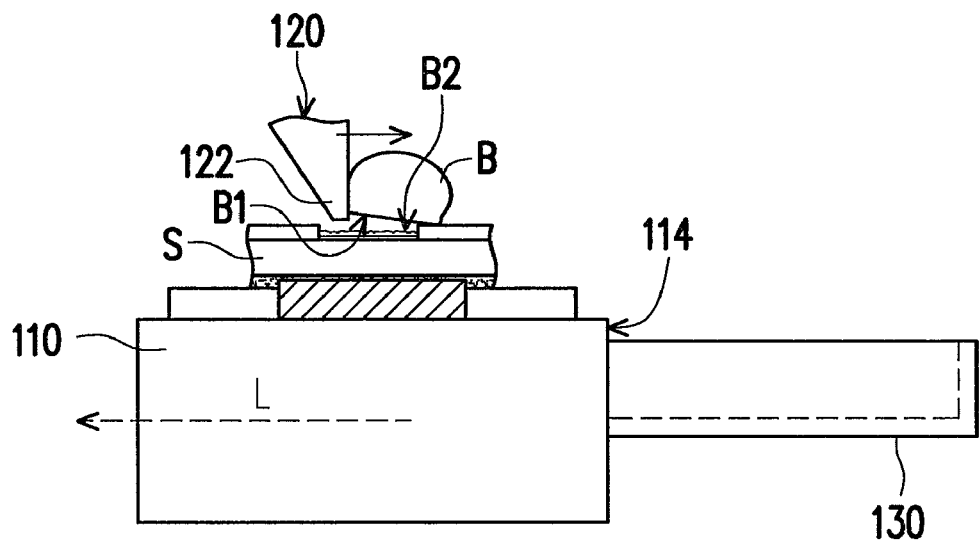
Figure 1C:
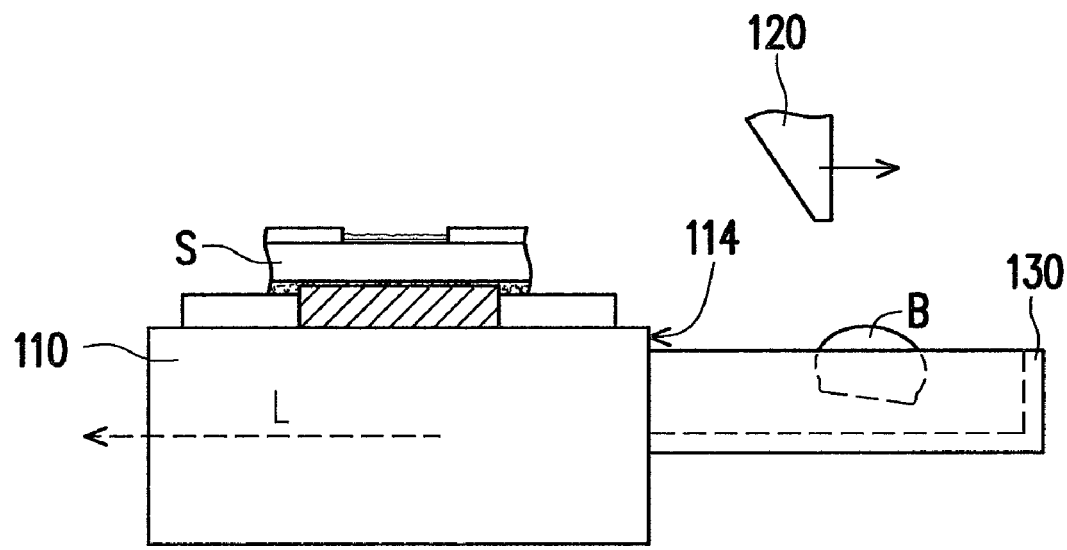
Figure 2:
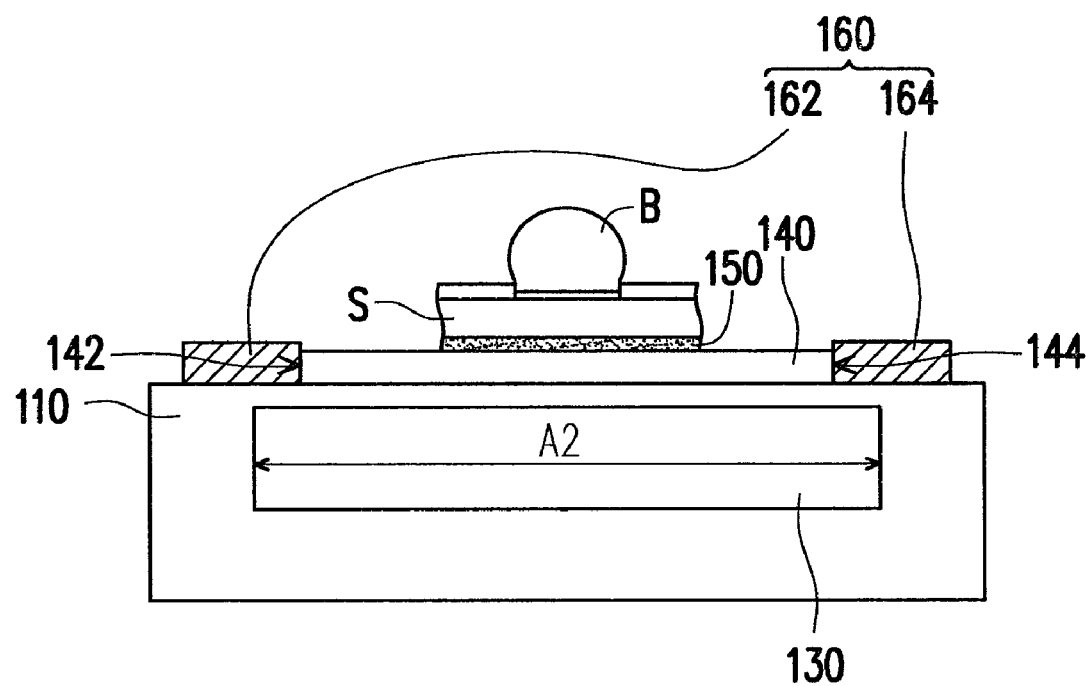
FIG. 2 is a schematic diagram illustrating a fixing base and a metal bump catcher from a direction V in FIG. 1A.
Figure 3:
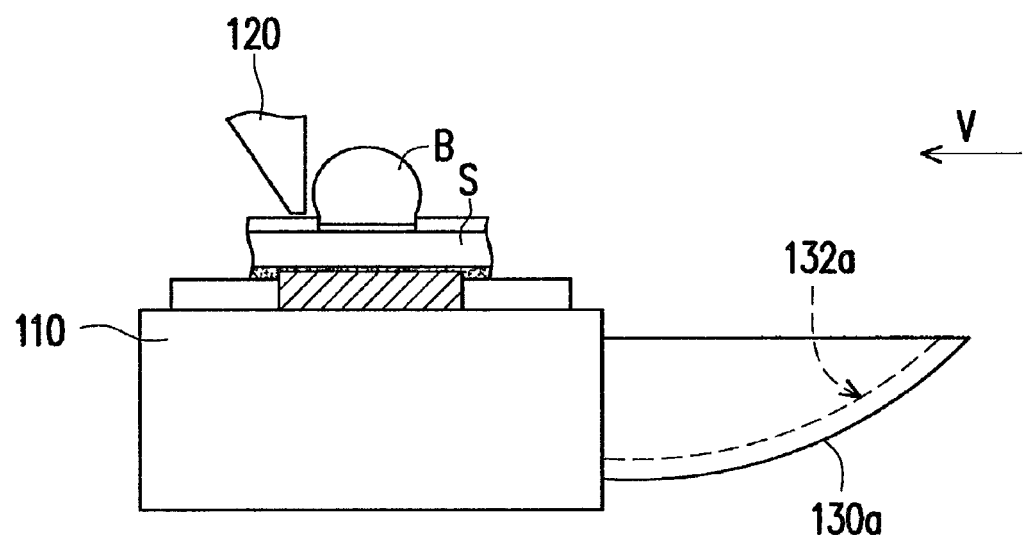
FIG. 3 and FIG. 5 are respectively schematic diagrams of two variation structures of the high speed ball shear machine in FIG. 1A.
Figure 4:
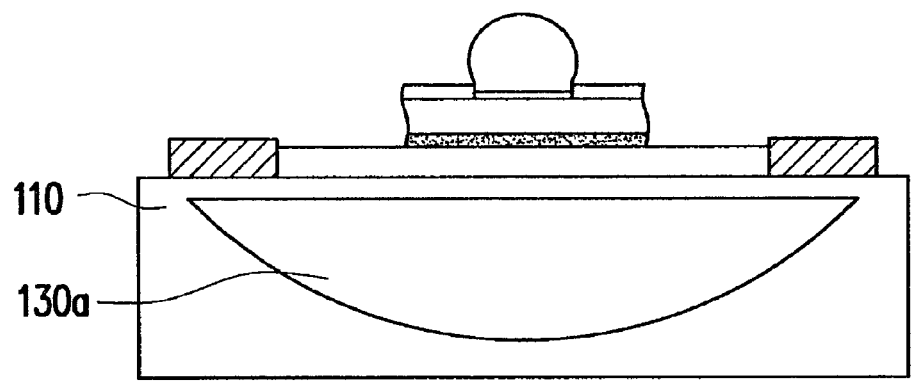
FIG. 4 is a schematic diagram illustrating a fixing base and a metal bump catcher from a direction V in FIG. 3.
Figure 5:
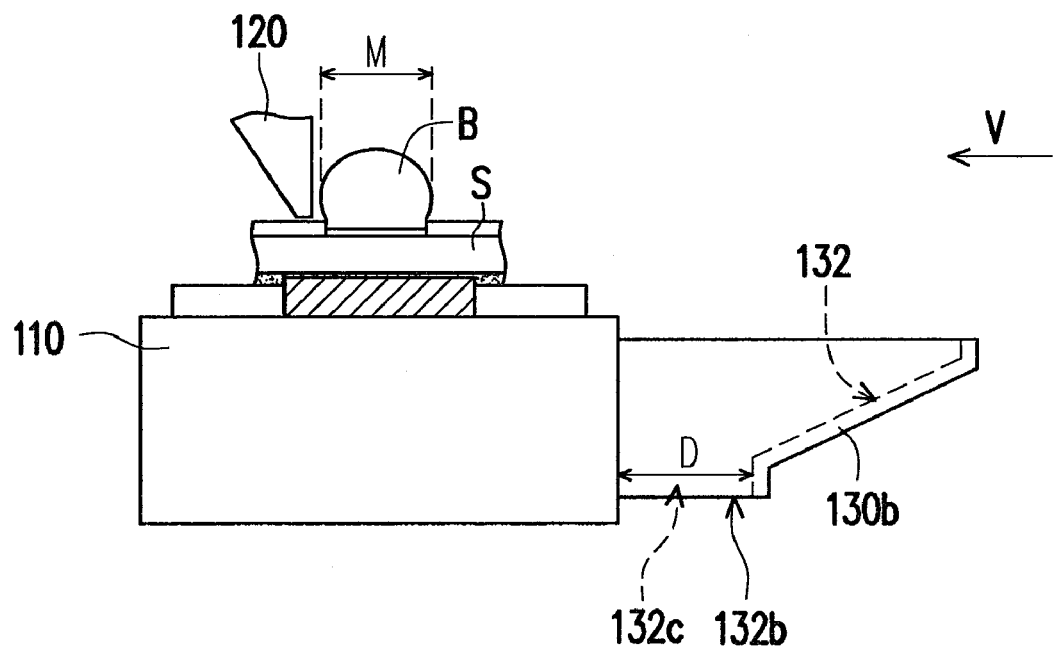
Figure 6:
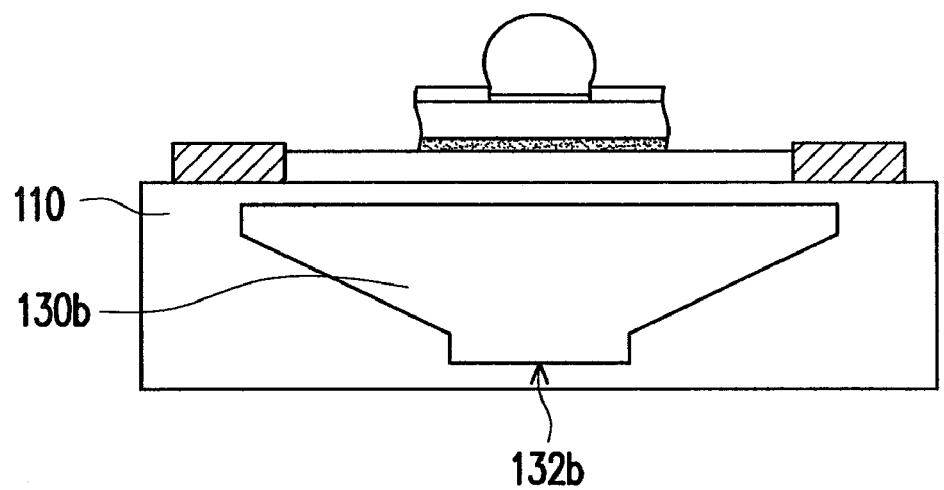
FIG. 6 is a schematic diagram illustrating a fixing base and a metal bump catcher from a direction V in FIG. 5.

FIGS. 1A through 1C are schematic diagrams illustrating a high speed ball shear machine in a ball shearing process according to one embodiment of the present invention. FIG. 2 is a schematic diagram illustrating a fixing base and a metal bump catcher of the high speed ball shear machine in FIG. 1A from a direction V. FIG. 3 and FIG. 5 are respectively schematic diagrams of two variation structures of the high speed ball shear machine in FIG. 1A. FIG. 4 is a schematic diagram illustrating a fixing base and a metal bump catcher of the high speed ball shear machine in FIG. 3 from a direction V. FIG. 6 is a schematic diagram illustrating a fixing base and a metal bump catcher of the high speed ball shear machine in FIG. 5 from a direction V.

Referring to FIG. 1A and FIG. 2 simultaneously, a high speed ball shear machine 100 of the present embodiment is adapted to remove a metal bump B fixed on a substrate S. Here, the metal bump B is an aluminum ball, for example. The high speed ball shear machine 100 includes a fixing base 110, a shear tool 120, and a metal bump catcher 130. The substrate S is fixed on a first surface 112 of the fixing base 110.

Specifically, the high speed ball shear machine 100 optionally includes a rigid sheet 140, an adhesive gel 150, and a clamp 160. The rigid sheet 140 is disposed between the fixing base 110 and the substrate S. The substrate S is adhered to the rigid sheet 140 via the adhesive gel 150. In the present embodiment, the rigid sheet 140 is a glass substrate, a metal substrate, a ceramic substrate, a plastic substrate, a circuit board, a composite material substrate, or other rigid substrates. A material of the adhesive gel 150 includes cyanoacrylate, which is referred as an instant glue, or other adhesive materials. The clamp 160 is fixed on the fixing base 110 and includes a first portion 162 and a second portion 164 disposed respectively on relative two sides 142-144 of the rigid sheet 140. The first portion 162 and the second portion 164 clamp the rigid sheet 140 for fixing the rigid sheet 140 on the fixing base 110.

The shear tool 120 is disposed on top of the first surface 112, and the fixing base 110 is adapted for translating along a translation path L relative to the shear tool 120. The translation path L is a straight path. When the fixing base 110 translates along the translation path L relative to the shear tool 120, an end 122 of the shear tool 120 drives the metal bump B toward a sidewall 114 of the fixing base 110 for the metal bump B to separate from the substrate S.

It should be noted that in the present embodiment, the translation of the fixing base 110 along a translation path L relative to the shear tool 120 represents that the shear tool 120 is fixed and the fixing base 110 is moving, or the fixing base 110 is fixed and the shear tool 120 is moving, or the fixing base 110 and the shear tool 120 are moving toward each other.

The metal bump catcher 130 is disposed on a sidewall 114 of the fixing base 110 and includes a fillister 132. Here, an open end OP of the fillister 132 faces the top of the first surface 112. An upper edge of the metal bump catcher 130 includes a second surface 134 facing the top of the first surface 112. The first surface 112 and the second surface 134 are disposed on different planes, and the sidewall 114 is connected therebetween. In details, the fixing base 110 has a third surface 116 away from the shear tool 120. In addition, a height H1 of the second surface 134 relative to the third surface 116 is smaller than a height H2 of the first surface 112 relative to the third surface 116.

In the present embodiment, the metal bump catcher 130 has a bent line F which divides the metal bump catcher 130 into a bottom plate 136 and a sidewall 138. An edge of the sidewall 138 is connected with an edge of the bottom plate 136. The metal bump catcher 130 is a rectangular structure, for instance. Moreover, a length A1 of the metal bump catcher 130 is approximately 10 cm, a width A2 thereof is approximately 8 cm, and a height A3 thereof is approximately 3 cm. A material of the metal bump catcher 130 is metal or other suitable materials. The material of the metal bump catcher 130 is the same as that of the fixing base 110. The metal bump catcher 130 and the fixing base 110 is an integrated structure, for example. The metal bump catcher 130 and the fixing base 110 are formed separately and the metal bump catcher 130 is jointed to the fixing base 110 via a joint process.

Next, referring to FIG. 1B, the fixing base 110 translates along the translation path L relative to the shear tool 120. The end 122 of the shear tool 120 drives the metal bump B toward a sidewall 114 of the fixing base 110. At this time, the metal bump B is cracked by a shearing force of the shear tool 120, and moves along a shearing direction (that is, the direction toward the sidewall 114 of the fixing base 110) of the shear tool 120, thereby dropping into the metal bump catcher 130 disposed on the sidewall 114 of the fixing base 110 (referring to FIG. 1C). It should be noted that the shear tool 120 continues to move after striking the metal bump B. In the present embodiment, the shear tool 120 moves to be directly above the metal bump catcher 130 (referring to FIG. 1C).

As mentioned above, the metal bump catcher 130 of the present embodiment directly collects the metal bump B dropped by the shear tool 120 and does not need to shut down the operation of the machine when searching for the metal bump B inside the machine. Hence, the metal bump catcher 130 saves the time and labor for collecting the metal bump B. Additionally, in the present embodiment, the metal bump catcher 130 is firstly emptied and then used to collect the metal bumps B stricken by a single high speed ball shearing. Therefore, in the present embodiment, a location of a brittle interface of the metal bump B is determined by comparing a cracked face B1 of the metal bump B collected by the metal bump catcher 130 and a portion of a cracked face B2 of the metal bump B remained on the substrate S (referring to FIG. 1B), so that an accuracy of a cracked face analysis of the metal bump B is enhanced.

In other embodiments, an inside wall 132a of a metal bump catcher 130a is a curved face (referring to FIG. 3 and FIG. 4). The metal bump catcher 130a has, for example, a curved shape. In another embodiment, a metal bump catcher 130b has a fiurel shape, and a bottom end 132b of the metal bump catcher 130b includes a through hole 132c (referring to FIG. 5 and FIG. 6). A diameter D of the through hole 132c is greater than a greatest diameter M of the metal bump B. As a result, when the metal bump B drops into the fillister 132 of the metal bump catcher 130b, the metal bump B directly passes through the through hole 132c and drops into the metal bump collector (not shown) disposed under the through hole 132c.

In summary, in search of the metal bumps inside the machine, the metal bump catcher of the present invention is capable of directly collecting the metal bumps dropped by the shear tool without shutting the machine down. Hence, the metal bump catcher saves the time and labor required for collecting the metal bumps. Moreover, in the present invention, the metal bump catcher is utilized to collect the metal bumps stricken by a single high speed ball shear. Hence, in the present invention, the location of the brittle interface of the metal bump is clearly determined by comparing the cracked face of the metal bump collected by the metal bump catcher and a portion of the cracked face of the metal bump remained on the substrate, so that the accuracy of the cracked face analysis of the metal bump is enhanced.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A high speed ball shear machine, adapted for removing a metal bump fixed on a substrate, comprising:
    a fixing base, the substrate fixed on a first surface of the fixing base;
    a shear tool, disposed on a top of the first surface and the fixing base adapted for translating along a translation path relative to the shear tool, wherein the translation path is a straight path and when the fixing base translates along the translation path relative to the shear tool, an end of the shear tool drives the metal bump toward a sidewall of the fixing base, so that the metal bump cracks to separate from the substrate; and
    a metal bump catcher, disposed on the sidewall of the fixing base and having a fillister, wherein the metal bump catcher moves with the fixing base that translates along the translation path relative to the shear tool.

2. The high speed ball shear machine as claimed in claim 1, wherein an inside wall of the metal bump catcher is a curved face.

3. The high speed ball shear machine as claimed in claim 2, wherein a shape of the metal bump catcher is a funnel shape and a bottom end of the metal bump catcher comprises a through hole having a diameter greater than a greatest diameter of the metal bump.

4. The high speed ball shear machine as claimed in claim 1, wherein the metal bump catcher comprises a bent line dividing the metal bump catcher into a bottom plate and a sidewall, and an edge of the sidewall connects with an edge of the bottom plate.

5. The high speed ball shear machine as claimed in claim 1, wherein an upper edge of the metal bump catcher comprises a second surface facing the top of the first surface, and the first surface and the second surface are located on different planes while the sidewall is connected the first surface and the second surface.

6. The high speed ball shear machine as claimed in claim 1, wherein the metal bump catcher is a rectangular structure.

7. The high speed ball shear machine as claimed in claim 6, wherein a length of the metal bump catcher is substantially 10 centimeter (cm).

8. The high speed ball shear machine as claimed in claim 6, wherein a width of the metal bump catcher is substantially 8 cm.

9. The high speed ball shear machine as claimed in claim 6, wherein a height of the metal bump catcher is substantially 3 cm.

10. The high speed ball shear machine as claimed in claim 1, wherein a material of the metal bump catcher comprises a metal.

11. The high speed ball shear machine as claimed in claim 1, wherein a material of the metal bump catcher is the same as a material of the fixing base.

12. The high speed ball shear machine as claimed in claim 11, wherein the metal bump catcher and the fixing base form an integrated structure.

13. The high speed ball shear machine as claimed in claim 1, further comprising:
    a rigid sheet, disposed between the fixing base and the substrate; and
    an adhesive gel, disposed between the rigid sheet and the substrate.

14. The high speed ball shear machine as claimed in claim 13, wherein the rigid sheet is a glass substrate, a metal substrate, a ceramic substrate, a plastic substrate, a circuit board, or a composite material substrate.

15. The high speed ball shear machine as claimed in claim 13, wherein a material of the adhesive gel comprises cyanoacrylate.

16. The high speed ball shear machine as claimed in claim 13, further comprising:
    a clamp, fixed on the fixing base and comprising a first portion and a second portion disposed respectively on relative two sides of the rigid sheet, wherein the first portion and the second portion clamp the rigid sheet for fixing the rigid sheet on the fixing base.

* * * * *